US007912185B2

(12) United States Patent
Stanners

(10) Patent No.: US 7,912,185 B2
(45) Date of Patent: Mar. 22, 2011

(54) SYSTEM AND METHOD FOR PROVIDING THE PRECISE LOCATION OF A CELL PHONE MAKING AN EMERGENCY CALL

(75) Inventor: Sydney Devlin Stanners, Sidney (CA)

(73) Assignee: Celphinder Technologies, Inc., Sidney, BC (CA)

( * ) Notice: Subject to any disclaimer, the term of this patent is extended or adjusted under 35 U.S.C. 154(b) by 1217 days.

(21) Appl. No.: 11/455,520

(22) Filed: Jun. 19, 2006

(65) Prior Publication Data

US 2007/0004379 A1  Jan. 4, 2007

Related U.S. Application Data

(63) Continuation-in-part of application No. 10/092,600, filed on Mar. 8, 2002, now abandoned.

(60) Provisional application No. 60/274,207, filed on Mar. 9, 2001.

(51) Int. Cl.
*H04M 11/00* (2006.01)

(52) U.S. Cl. ........................... 379/45; 379/37; 456/404.2

(58) Field of Classification Search .................... 379/45, 379/37–40; 455/404.1, 404.2
See application file for complete search history.

(56) References Cited

U.S. PATENT DOCUMENTS

| 5,305,370 | A | * | 4/1994 | Kearns et al. ................... 379/45 |
| 5,337,342 | A | | 8/1994 | Kruger et al. |
| 5,526,403 | A | | 6/1996 | Tam |
| 5,640,147 | A | * | 6/1997 | Chek et al. ...................... 379/38 |
| 5,745,849 | A | | 4/1998 | Britton |
| 6,032,036 | A | | 2/2000 | Maystre et al. |
| 6,104,783 | A | * | 8/2000 | DeFino .......................... 379/38 |
| 6,377,169 | B1 | | 4/2002 | Yanagisawa |
| 2004/0033795 | A1 | * | 2/2004 | Walsh et al. ............... 455/404.1 |
| 2005/0084075 | A1 | * | 4/2005 | Kotzin ........................... 379/38 |

* cited by examiner

*Primary Examiner* — Stella L Woo
(74) *Attorney, Agent, or Firm* — Diederiks & Whitelaw, PLC

(57) ABSTRACT

The present invention relates to providing precise location data to a 911 operator of a cell phone operator who initiates a 9-1-1 call and, more particularly, to the interaction of transmitting circuitry in a cellular telephone and complementary receiving circuitry in a landline telephone or stand-alone unit. When a cellular 9-1-1 call is made within proximity of a landline telephone or a stand-alone unit, an interaction takes place between the enabled cell phone and the landline telephone. Upon receiving and decoding the cellular transmission, the landline telephone or stand-alone unit transmits a 9-1-1 call which provides more precise location data (in the form of the landline telephone's subscriber's identification) to a 911 operator than if the 9-1-1 call was simply connected to the operator from the cell phone. The present invention has further applications for locating a 9-1-1 call from a landline telephone connected through a PBX-type master switching box.

39 Claims, 8 Drawing Sheets

SYSTEM AND METHOD FOR PROVIDING THE PRECISE LOCATION OF A CELL PHONE MAKING AN EMERGENCY CALL

CROSS REFERENCE TO RELATED APPLICATIONS

This application is a continuation in part of U.S. application Ser. No. 10/092,600 filed Mar. 8, 2002, now abandoned claiming priority from U.S. Application Ser. No. 60/274,207 filed Mar. 9, 2001.

FIELD OF THE INVENTION

The present invention relates to the field of providing precise location data for 911 calls made from cell phones and from landline telephones connected to a PBX-type master switching box. More specifically, the present invention provides a method and apparatus to provide a landline telephone subscriber's ID proximate to a cell phone user or office phone user to a 911 Operator upon the user initiating a 911 call.

BACKGROUND OF INVENTION

When a 911 call is placed from a landline telephone, the address of the landline telephone is immediately displayed on the 911 operator's or public safety answering point operator's screen which occurs without verbal communication from the 911 caller. However, when a 911 call is placed from a cellular telephone, the caller's location does not show on the 911 operator's screen, and unless verbal communication takes place between the 911 operator and the caller, the location source of the 911 call (and therefore, the caller) is not passed along to the 911 operator. In other cases, although the caller is able to communicate with the 911 operator, the caller may be unable to provide the operator with the caller's current location. Accordingly, all cell phones are at a disadvantage when contacting emergency 911 operators relative to contact from a landline telephone.

The Federal Communications Commission (FCC) in the United States has mandated that cell phone carriers must automatically provide the location of 911 calls made from a cell phone to public safety answering points within certain accuracy parameters (specifically, within 50 meters 67% of the time and within 100 meters 95% of the time). The FCC has discussed additional requirements with respect to providing precise location data for a 911 call made from inside a building, structure or facility. The foregoing requirements are collectively commonly referred to as the FCC's e911 mandate. Failure to provide precise location data of the caller's location may place the caller's life in jeopardy, which is why the FCC has set high standards. For example, police officers responding to GPS or TDOA type location data might have to search dozens or even hundreds of apartments or offices before finding the precise location of the 911 caller since such technologies give a latitude/longitude reference to the 911 call, which may, depending on the terrain, building structure and signal attenuation, provide a reference point which may be several hundred feet from the location of the 911 call.

Several companies are trying to satisfy the FCC requirement by using Global Positioning Signal (GPS) or Time Distance of Arrival (TDOA) between cell towers to provide location data. These technologies are achieving only limited success in consistently providing accurate location data in urban areas and in rural settings sometimes missing the actual caller's location by several hundred feet. Companies using these technologies experience even less success accurately locating the caller when the caller is in a building where the cell phone's signal is shielded. This creates many difficulties as cell phones are often used in residences, apartments and office towers, warehouses, factories and schools.

When a 911 call is made from a landline telephone in an office that is connected to the landline via a PBX type master switching box then only the street address appears on the 911 operator's screen which also makes obtaining the caller's precise location challenging. For example, a 911 call placed from a landline on the $35^{th}$ floor of an office tower will only reveal the office tower address to the 911 operator. The 911 operator would only know that the call was placed from the $35^{th}$ floor (and specifically office no. 3526) if the caller spoke with the responding 911 operator.

This presents difficulties as, in many cases such as sudden illness, armed robbery or assault, the caller can dial 911, but is unable to speak with the 911 operator (or may not know or remember the address). The lack of precise location data provided to the 911 operator in such a situation may put the caller's life in jeopardy. Another example is personnel working alone. Such personnel would benefit from technology that would allow them to surreptitiously contact and provide a 911 operator with their current location data. Since in many instances an overt call for help could trigger a violent reaction from an actual or potential aggressor, being able to contact a 911 operator without alerting the actual or potential aggressor could be life saving.

Due to the difficulties associated with providing 911 operators with precise location data from cell phones and office phones in the circumstances described above, it is desirable to provide a system and method for providing more precise location data to a 911 operator without requiring the caller to verbally communicate location data with the 911 operator.

BRIEF SUMMARY OF THE INVENTION

It is an object of the present invention to overcome the disadvantages of the prior art by providing a system and method for consistently providing accurate location data to a 911 operator when a 911 call is made from a cell phone or a landline connected to a PBX type master switching box.

The present invention in various embodiments includes a transmitter (most typically a cell phone) and a corresponding receiver (or a set of transceivers) and a pre-dialer connected to the receiver or one of the transceivers which is capable of transmitting a signal encoded with precise location data to a 911 operator.

It is further object of the present invention to satisfy the FCC's e-911 mandate that a cell phone must automatically provide the location of 911 calls made from a cell phone to public safety answering points within certain accuracy parameters.

In one embodiment the present invention provides a 911 operator with the precise address of an incoming 911 call made from a cellular telephone. More specifically, the present invention provides a system and method for sharing the nearest telephone company subscriber's identification, already embedded into subscribers' landline telephone system, with a 911 call to provide the 911 operator with the precise location of the 911 caller. That is, when a 911 phone call is made from an enabled cell phone which is proximate to an enabled landline telephone or an enabled wall jack, an interaction is initiated between the cell phone and the landline telephone which ultimately provides the 911 operator with the subscriber identification for the landline telephone which provides precise location data.

In a further embodiment, the present invention provides the precise location of a 911 call placed by a landline telephone connected through a PBX-type master switching box using a similar system and method.

In still further embodiments, various arrangements, systems and methods for using a cell phone and corresponding receiver (or set of transceivers) and pre-dialer are taught.

BRIEF DESCRIPTION OF THE DRAWINGS

Embodiments of the present invention will now be described by way of example only, with reference to the attached Figures wherein.

DETAILED DESCRIPTION

Figure 1:
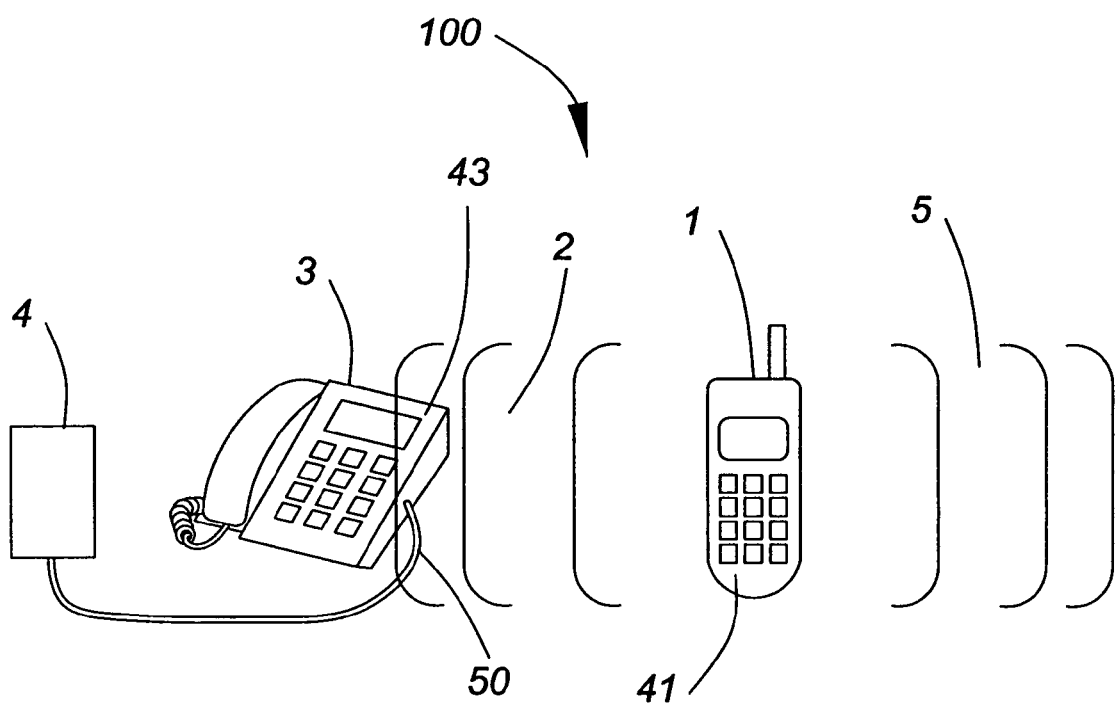
FIG. 1 is a schematic showing transmission from an enabled cell phone to an enabled landline telephone wall jack in accordance with the present invention.

Generally, the present invention provides a system and method for providing accurate location data to a 911 operator when a 911 call is made from a cell phone or from a landline telephone which is connected to a PBX type master switching box.

In a general embodiment, the system 100 includes a transmitter (preferably integrated in a cell phone) 41 capable of broadcasting a triggering signal 2 for receipt by a corresponding receiver 43 (or, alternatively, a pair of transceivers or a suitable combination of transmitters, transceivers and receivers). The receiver 43 receives signals sent from the transmitter 41 (or cell phone). That is, in one embodiment, the system 100 contemplates a cell phone call being intercepted by a receiver 43. In one embodiment the transmitter 41 sends two signals upon activation of a 9-1-1 call, in particular a regular 9-1-1 cellular transmission and a short range signal for receipt by a receiver. The receiver 43, in turn, activates a predialer 50 which is capable of transmitting a second or call signal to a 911 operator where such second signal is encoded with identifying information which is convertible (or automatically converted) by a 911 operator into precise location data.

Figure 8:
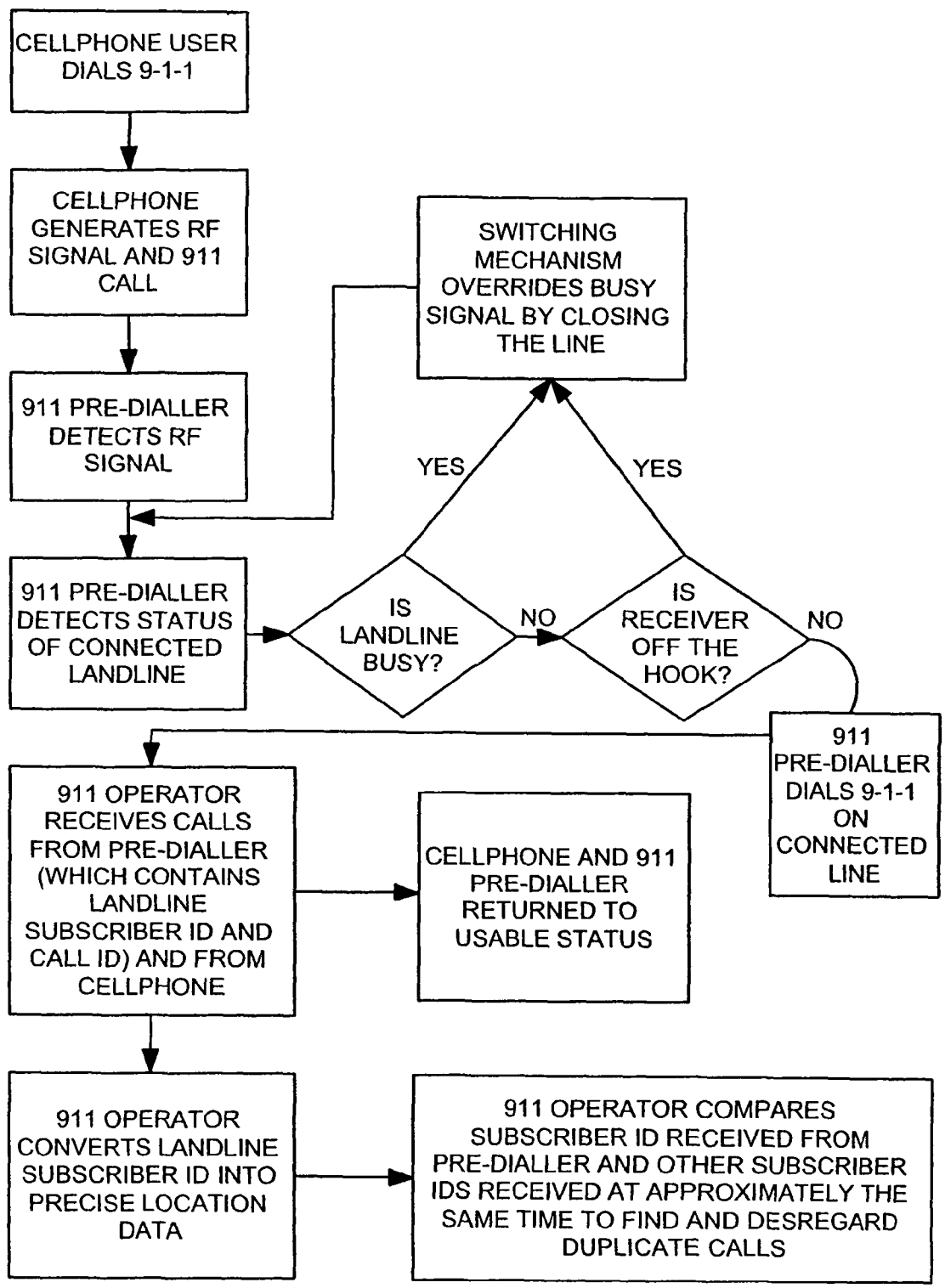
FIG. 8 is a flow diagram showing a method for providing precise location information using the system provided in FIG. 1 in accordance with the present invention.

In one embodiment as shown in FIGS. 1 and 8, the system 100 provides a subscriber's identification from a landline telephone nearest to a cell phone making a 911 call. In this embodiment, the cell phone 1 has a transmitter 41 for transmitting a triggering signal 2 to the nearest landline telephone 3 or wall jack 4. The landline telephone 3 or wall jack 4 is equipped with a complementary receiver 43 for receiving the triggering signal 2 and the landline telephone 3 is further equipped with a pre-dialer 50. Predialer 50 is a device capable of completing a telephone call and in this embodiment is used for initiating a 9-1-1 call to a 911 operator. Upon receiving the triggering signal 2 from the cell phone 1 (which transmission is initiated upon a 9-1-1 call being initiated by the cell phone 1), the receiver 43 activates the predialer 50 which completes a 9-1-1 call. Upon the 911 operator's receipt of the call from the predialer 50, the 911 operator is provided with the subscriber information for the landline telephone 3 which can be easily converted by the 911 operator (or is automatically converted for the 911 operator) into precise location data for the caller (typically a street address). A worker skilled in the art will appreciate and understand that increasingly calls made from a landline telephone will automatically include the subscriber identification associated with the phone number assigned to the landline telephone.

A worker skilled in the art will appreciate that the receiver 43 and the predialer 50 may be installed and linked to the wall jack or installed in a wall jack or wall outlet box, thereby alleviating the need for a landline phone 3.

In one embodiment, the transmitter 41 is integrated with the cell phone 1 either by adding an interface module (not shown) to the cell phone 3, building the transmitter 41 into the cell phone's chipset or simply using a regular cell phone's existing circuitry. Further in this embodiment, the landline telephone's circuitry may integrate the receiver 43 and predialler 50. A worker skilled in the art will appreciate that software installed on the cell phone may alleviate the need for a separate transmitter in the cell phone.

Figure 2:
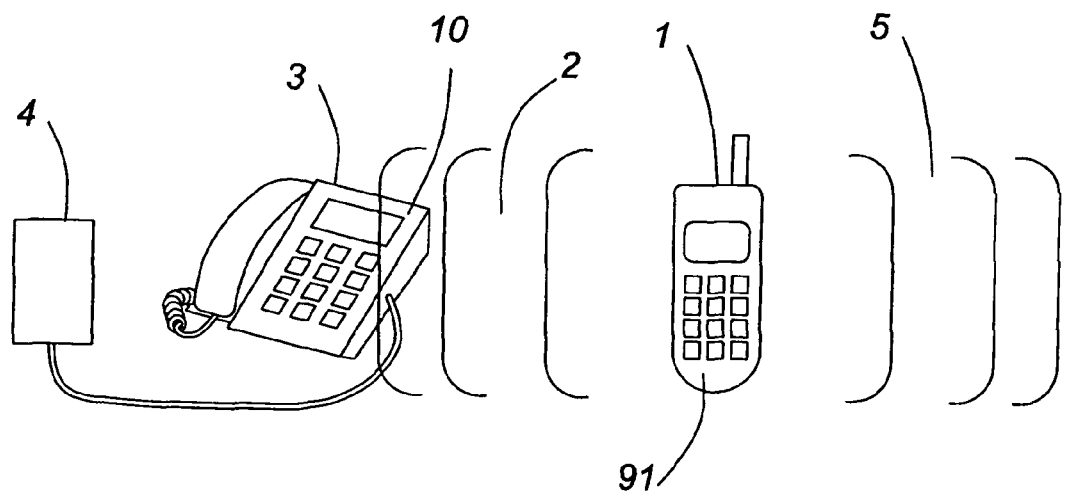
FIG. 2 is a schematic showing transmission from a cell phone to a landline telephone wall jack in accordance with the present invention.
Figure 2A:
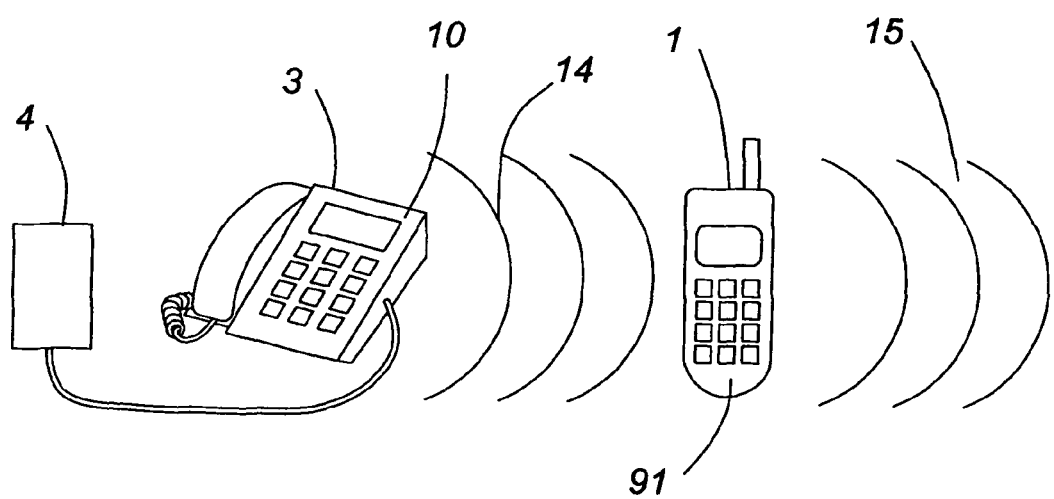
FIG. 2A is a schematic showing a sequence of transmissions from an enabled wall jack and landline telephone to an enabled cell phone and then relayed to cell tower in accordance with the present invention.

Another embodiment of the present invention, shown in FIGS. 2 and 2A, involves installing a first transceiver 91 in a cell phone 1 or interface module (not shown) which is activated when the cell phone user dials 9-1-1. The transmitted signal 2 is received by a second transceiver 10 in a nearby landline telephone 3. The transceiver 10 is imprinted with the subscriber ID in a signal 14 that is returned and decoded by the transceiver 91. The subscriber data is then transmitted via signal 15 from the cell phone 1 to either the cell provider where it is switched to the public safety answering point or directly to the public safety answering point for decoding to obtain precise location data of the cell phone user. In any such embodiments using a transceiver 91, the cell phone 1 may send only a non-cellular signal from transceiver 91 and, if signal 14 is received by transceiver 91 then the cell phone would transmit signal 15 but if signal 14 is not received by transceiver 91 then the cell phone would initiate a 9-1-1 call through cellular means.

The cell phone embodiments will work in any location within cell phone range of a cell tower and will also work where normal cell phone transmissions are blocked, out of range, or in areas not serviced by a cell phone network. Under these circumstances, it is necessary only for the cell phone 1 to transmit a signal 2 to an enabled landline telephone 3.

In a similar embodiment as that shown in FIGS. 2 and 2A, the system can be used to locate lost or abducted children.

More specifically, a transceiver 91 is placed or integrated into a child's clothing or other apparel or in any other innocuous place where it would not be tampered with by the child and where it would avoid detection. Upon the child becoming lost or being abducted, a parent or guardian would initiate a signal to transceiver 91 from a transmitter (not shown). Transceiver 91, encoded with a unique identifier for the child, would in turn transmit a signal which would be received by the nearest enabled landline telephone 3, wall jack 4 or cell phone 1 which would in turn initiate a 9-1-1 call providing precise location data which would enable rescuers to find the child.

Figure 3:
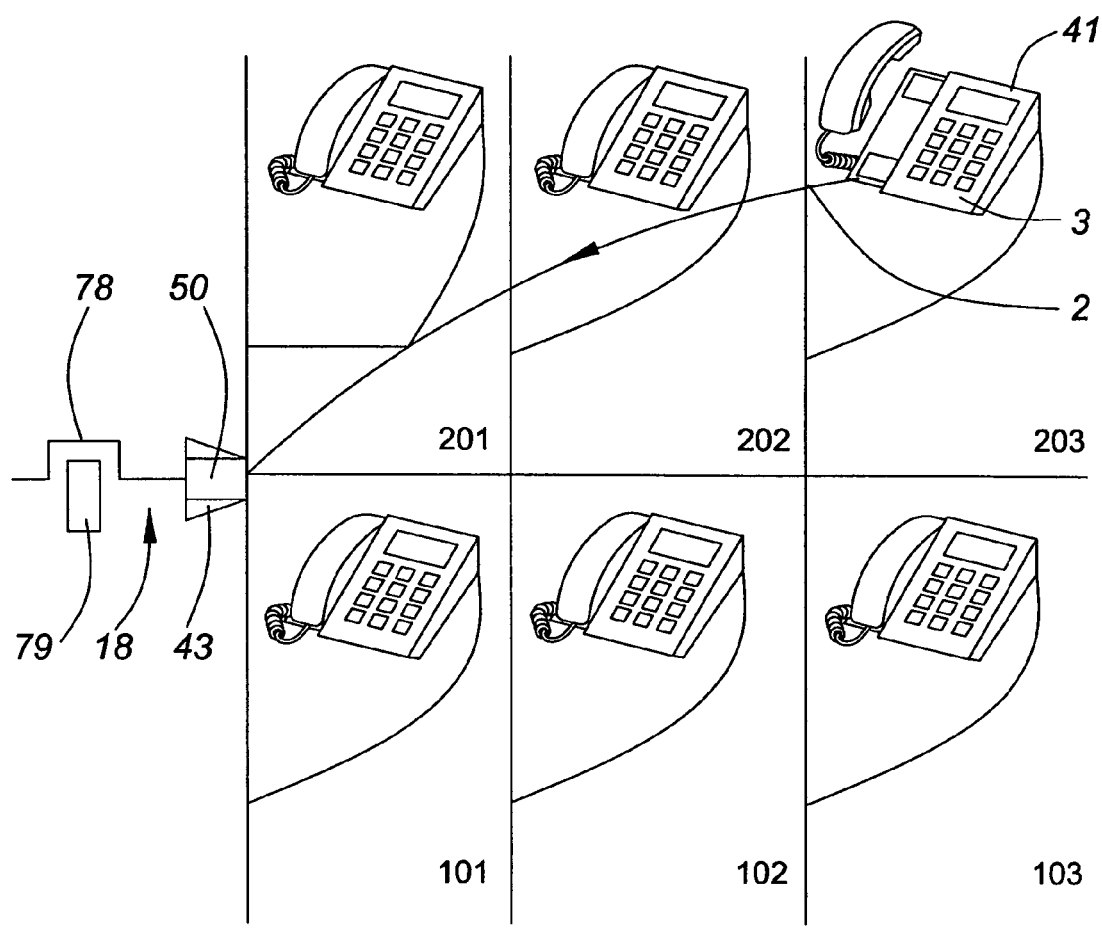
FIG. 3 is a schematic showing a converted landline telephone dialing sequence (911) initiating a transmission to an enabled junction box in accordance with the present invention.

In another embodiment shown in FIG. 3, the present invention provides specific office or room location data from a landline telephone 3 within an office building or other multi-room building to a 911 operator where otherwise the 911 operator would merely receive the building's street address. More specifically, in this embodiment, a bypass circuit 78 is installed such that it bypasses the PBX type master switching box 79 and terminates directly at a junction box 18 for the office. The bypass circuit 78 includes the embedded 911 location data. A desk phone or other landline telephone 3 includes a transmitter 41 which communicates with a receiver 43 which may be installed at the office junction box 18. Upon a user dialling 9-1-1 from the landline telephone 3, the landline telephone 3 transmits a triggering signal 2 which is received by the receiver 43 at the junction box 18. This activates a pre-dialler 50 which in turn places a 9-1-1 call with the 911 location data through the bypass circuit 78. When the 911 operator receives the call from the pre-dialler 50, the 911 operator is provided with the 911 location data and is therefore provided with precise location data for the caller, either an office number or a room number. The 911 operator will also receive a call processed through the PBX-type master switching box 79 and will be able to compare approximate address locations and the timestamps for the two calls to eliminate the redundant call received directly from the landline telephone 3 call being processed through the PBX-type master switching box 79. Further, the 911 operator will be able to gain more precise location data.

In a further embodiment, a 9-1-1 call initiated by a cell phone 1 made from within an office or multi-room building or facility may have its signal 2 intercepted by a nearby landline telephone 3 or wall jack 4 which is attached to a bypass circuit 78 and includes a transmitter 41 for communicating with a receiver 43 located in the office junction box 18. Accordingly, the landline telephone 3 would transmit a triggering signal 2 to the office junction box 18 which would, upon the receiver 43 triggering a pre-dialler 50 also located at the office junction box 18, complete a call to a 911 operator, such call including the specific office or room location of the landline telephone 3 and therefore providing the 911 operator with very precise location data for the cell phone caller.

Figure 4:
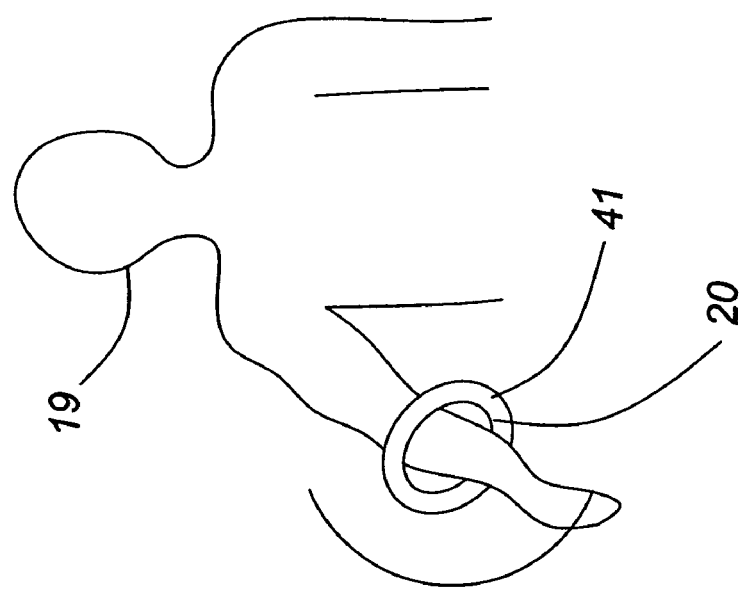
FIG. 4 is a schematic showing a lone worker activating a triggering key, the resulting transmission being received at an enabled wall jack or landline telephone in accordance with the present invention.
Figure 4:
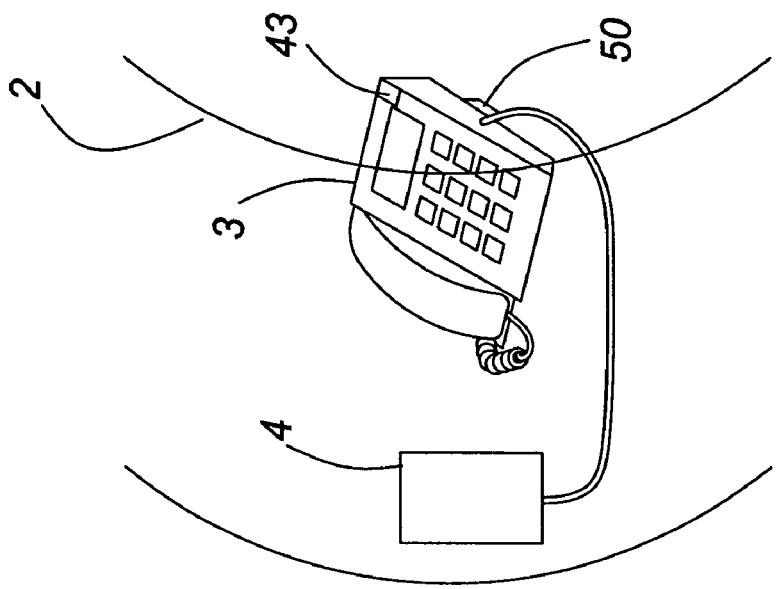
Figure 5:
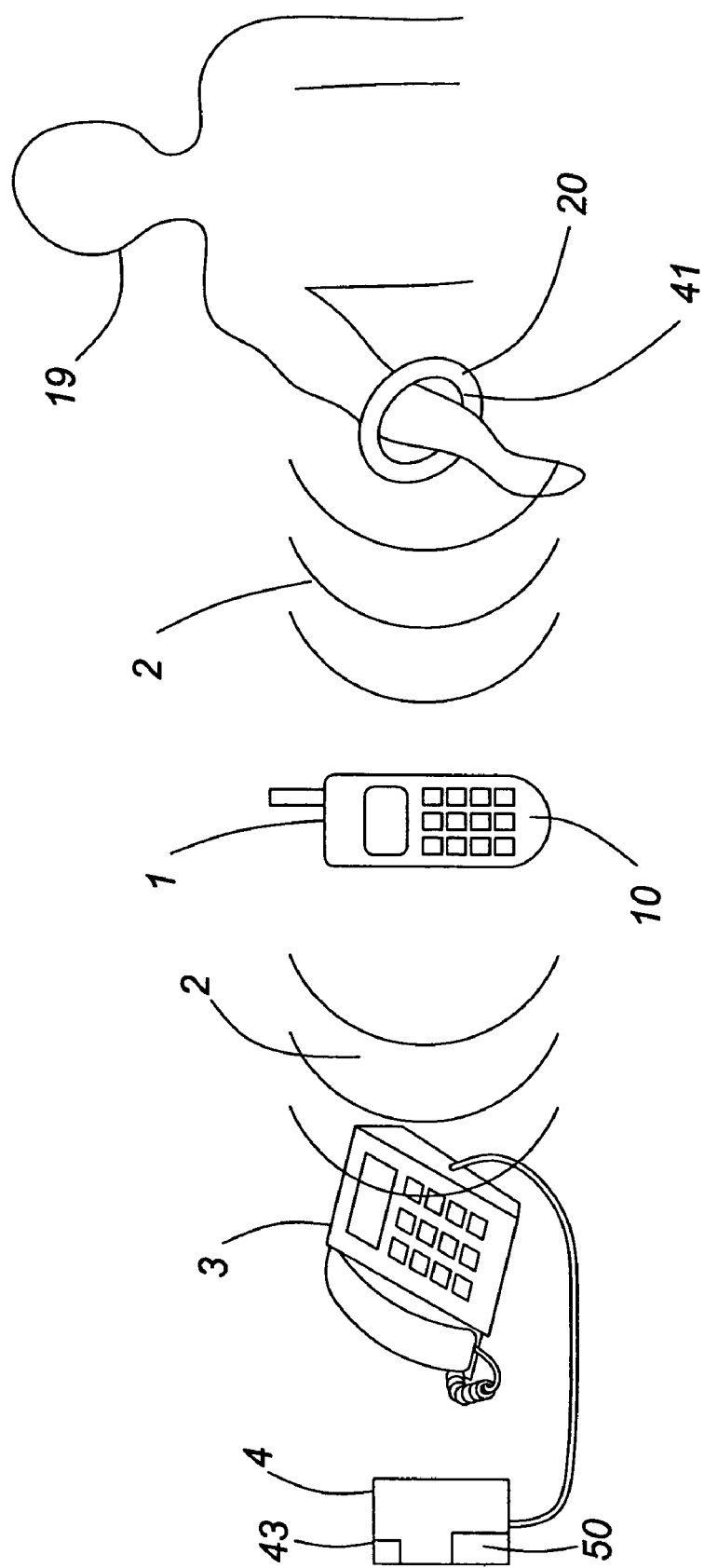
FIG. 5 is a schematic showing a lone worker activating a triggering key, the resulting transmission being received by a cell phone and subsequently relayed to an enabled wall jack/line telephone in accordance with the present invention.

In a further embodiment, the present invention may be used by a lone worker 19 to surreptitiously make a 911 call through the use of a triggering key 20. The triggering key 20, which may be disguised as any commonly worn item, includes a transmitter 41 for sending a triggering signal 2 to a cell phone 1 (FIG. 5) or landline telephone 3 (FIG. 4) or wall jack 4 (not shown) which is enabled with a transceiver 10 (in the case of a cell phone) or a receiver 43 and predialer 50 (in the case of a landline telephone 3) to ultimately communicate precise location data to a 911 operator. Upon receiving the triggering key's signal, the cell phone 1 receives signal 2 and transmits signal 2 via transceiver 10 to the nearest receiver 43 for further handling in accordance with the system embodiments described above. In the case of a landline telephone 3 or wall jack 4 receiving the signal from the triggering key 20, the receiver 43 activates pre-dialler 50 to place a 911 call complete with precise location data.

Figure 6:
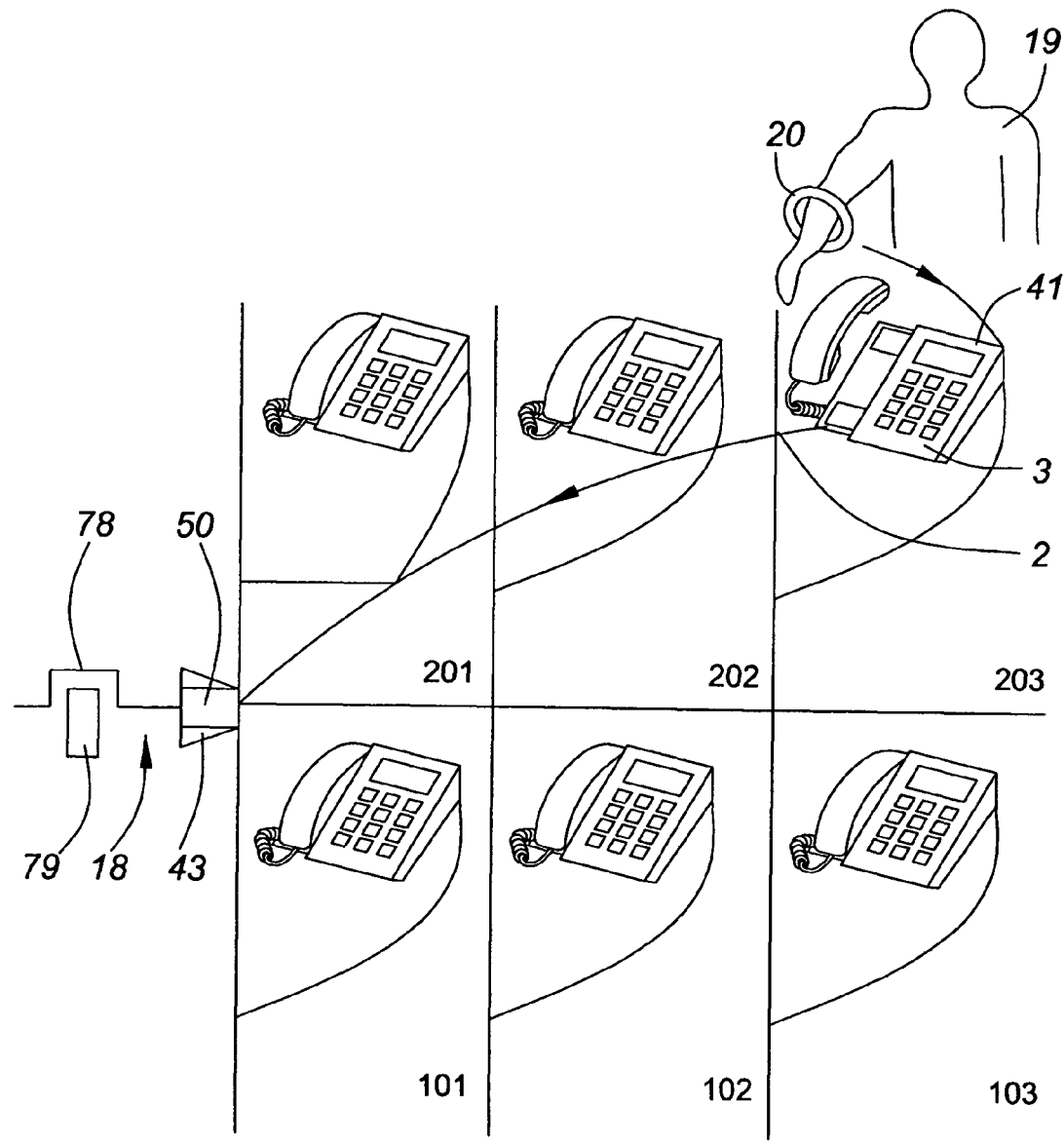
FIG. 6 is a schematic showing a lone worker activating a triggering key from an office building containing a PBX-type master switching box and the transmission resulting from activation of the triggering key being received by enabled junction box circuitry in accordance with the present invention.

In a still further embodiment, shown in FIG. 6, the triggering key 20 may communicate directly with a receiver 43 which would then cause a pre-dialler 50 to send the subscriber's identification information or the precise office location to a 911 operator.

A worker skilled in the art will appreciate that a lone worker 20 in the above embodiments may alternatively be a senior citizen, an individual with a disability or someone otherwise unable to reach a phone in an emergency. This would allow such an individual to freely roam their home or other facilities enabled with receiver 43 and predialer 50 without concern about carrying a cell phone or being proximate to a phone or other people if emergency assistance is required.

Another embodiment of the invention entails packaging a transceiver 10 with embedded location data in a small robust stand-alone unit 61. This stand-alone unit 61 (hardwired or battery powered) can be placed in various desirable locations such as underground parking garages, elevators and other locations where placing a landline telephone or wall jack would be difficult or conspicuous to set up in a city wide grid pattern to react to a cell phone 911 call in the same manner as the embodiments described above. The stand-alone unit 61 could also be attached to a landline and carry the necessary embedded location data and initiate a 911 call upon reception on a triggering signal 2 from a cell phone, triggering key or other device. This embodiment provides advantages of portability and alleviates the need to have an enabled landline telephone.

Figure 7:
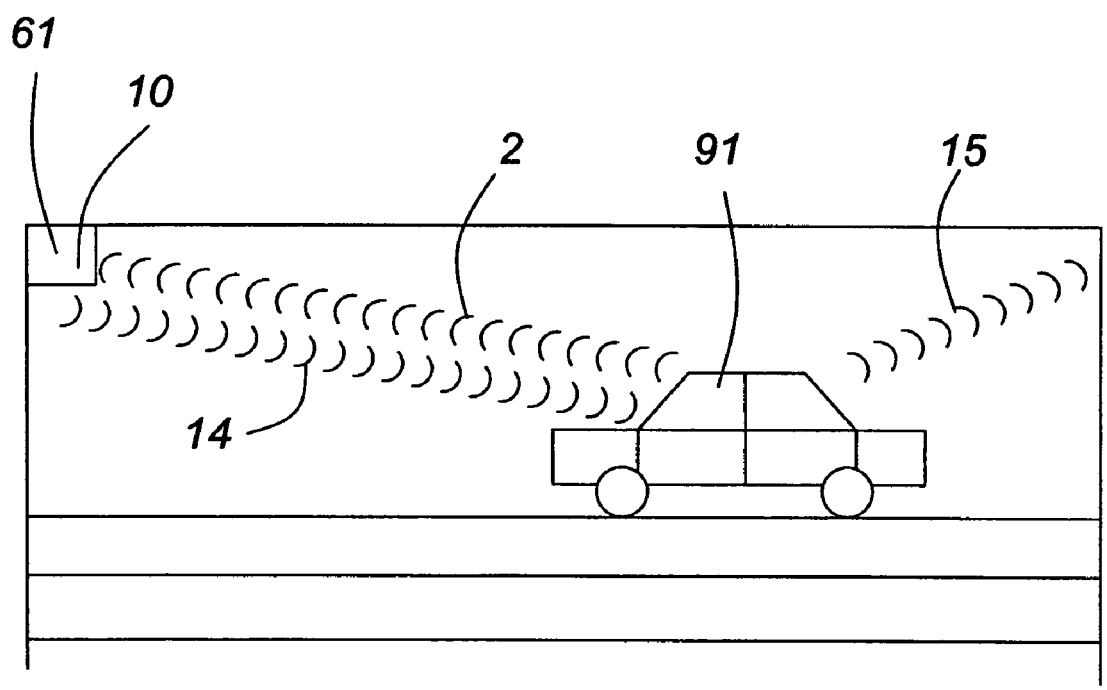
FIG. 7 is a schematic showing a stand-alone unit in communication with a vehicle communication system in accordance with the invention.

In a more specific embodiment shown in FIG. 7, circuitry within a vehicle (such as those found in vehicle communication systems) would be capable of transmitting a triggering signal 2 to the stand-alone unit 61 having transceiver 10 such that the vehicle communication system having a transceiver 91, which would normally be inoperative in a parkade or other covered area, would be able to communicate precise location data (that is, its location in the parkade or other covered area) via signal 15.

In any of the above embodiments, in the event that more than one enabled landline responds to the 9-1-1 call, the 911 operator can dismiss duplicate receptions by comparing location data of various cells and the timestamps of various calls or through the use of software typically used by 911 operators alone confronted with several calls for the same emergency. This function could also be handled automatically by software designed for this purpose. Similarly, redundant regularly-received 9-1-1 calls such as call 5 from cell phone 1 shown in FIG. 5 can be identified and ignored by the 911 operator. Furthermore, in the embodiments above where the cell phone sends a 9-1-1 signal which is received for further transmission, the 9-1-1 signal may also carry the cell's phone unique identifier to allow the 911 operator to more easily identify duplicate calls (and to allow the operator to call the cell phone operator directly) or may simply include a single code with the 9-1-1 signal to help the 911 operator identify cell phone calls.

In any of the above embodiments involving transmitting subscriber identification to the 911 operator, it should be noted that the subscriber identification may include the subscriber's name and address. Alternatively, the subscriber's identification could be shown as the subscriber's telephone number, in which case the 911 operator will check the telephone number to determine the subscriber's name and address.

In any of the above embodiments, the present invention will not interfere with the normal function of either cell or landline telephone systems and will not interfere with the usual transmission and reception of cell phone placed 911 calls.

In any of the above embodiments using a cell phone, a worker skilled in the art will appreciate that the term cell hone includes any other devices with cellular capabilities, such as a PDA with cellular capabilities, a Blackberry® device or any other comparable handheld or portable device.

A worker skilled in the art will appreciate that the landline can be substituted with any mode of communication used to contact a 911 operator and should not be read to limit the present invention to conventional phone line use. Without limiting the generality of the above statement, the landline may include cable television, fibre optics, satellite, ADSL, electrical lines, voice-over-IP, any combination of the foregoing, or other technology capable of transmitting an encoded signal to a 911 operator and may include intermediate steps such as being directed through a number of servers, routers, switches or similar directing devices necessary to complete the communication to the 911 operator.

Likewise, the term "landline telephone" will be understood by one skilled in the art to include not just conventional switched telephone sets, but any transceiver for voice communications over a landline, as broadly described above.

A worker skilled in the art will appreciate that the triggering signal 2 sent from any of the transmitters, transceivers or cell phones to any of the corresponding receivers can be radio frequency (RF) based or other wireless signal such as Bluetooth®. In the case of a Bluetooth® signal, the signal can be transmitted through connected Bluetooth® devices to reach an enabled landline telephone or enabled wall jack, thereby extending the effective range of the Bluetooth® signal.

A worker skilled in the art will appreciate that the system 100 can work in conjunction with and in parallel with prior art assisted GPS or TDOA systems. In particular, for rural, remote or open areas, a cell phone 1 may include a GPS chip to provide location data as an appropriate receiver 43 may not be available or proximate. This may prove to be especially useful in the embodiment described above with the lost or abducted child who may not be in the vicinity of a receiver 43.

A worker skilled in the art will appreciate that in any of the above embodiments, a transceiver could replace a transmitter or receiver.

A worker skilled in the art will appreciate than in countries outside of North America a different emergency code than 9-1-1 may be used. For example, the emergency number in South Korea is 1-1-9. Accordingly, a worker skilled in the art will appreciate that all references to 9-1-1 may be replaced with another emergency code to account for country, regional, state or geographical differences.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for transmitting subscriber information for a landline telephone to a 9 1 1 operator comprising:
    a cell phone including a first transceiver for transmitting a triggering signal;
    a landline telephone within a broadcast range of the cell phone including a second transceiver for receiving the triggering signal from the first transceiver and transmitting a return signal to the first transceiver thereby activating the first transceiver, the return signal including subscriber information obtained from the nearest landline telephone; and
    the first transceiver for receiving the return signal and, in response, for initiating a 9-1-1 call with the subscriber information embedded in the 9-1-1 signal.

2. A system as in claim 1 wherein the triggering signal indicates that a 9-1-1 call is being initiated.

3. A system as in claim 1 wherein the landline telephone is capable of transmitting an encoded signal to a 9 1 1 operator.

4. A system as in claim 1 wherein the landline phone is replaced with a stand alone stationary unit programmed with subscriber information.

5. A system for transmitting subscriber information for a landline telephone to a 9 1 1 operator comprising:
    a transmitter for transmitting a first triggering signal;
    a cell phone including a first transceiver for receiving the first triggering signal and for transmitting a second triggering signal upon reception of the first triggering signal;
    a landline telephone within the broadcast range of the transceiver, the landline telephone including a second transceiver for receiving the second triggering signal from the first transceiver and in response for transmitting a return signal to the first transceiver, the return signal including subscriber information obtained from the landline telephone; and
    the first transceiver for receiving the return signal and, in response, for transmitting the subscriber information to a 9 1 1 operator.

6. A system as in claim 5 wherein the triggering signal indicates that a 9-1-1 call is being initiated.

7. A system as in claim 5 wherein the receiver and predialler are integrated within a wall jack.

8. A system as in claim 5 wherein the receiver and predialler are integrated within a landline telephone.

9. A system as in claim 5 wherein the transmitter is integrated into existing circuitry in a vehicle communication system.

10. A system as in claim 9 wherein the vehicle communication system includes satellite transmission means for transmitting a 9-1-1 signal with precise location data to a 9 1 1 operator.

11. A system for providing a 9 1 1 operator with the precise location of a cell phone operator who initiates a 9-1-1 emergency call from a cell phone within the vicinity of any one of a plurality of landline telephones which have been modified to accept a signal from a cell phone and then initiate a second 9-1-1 emergency call, the second 9-1-1 call including Subscriber ID information which provides the 9 1 1 operator with precise location data, the system capable of providing the precise location data without any verbal communication between the cell phone operator and the 9 1 1 operator comprising:
    a cell phone including a transmitter for transmitting a first 9-1-1 signal;
    a landline telephone within the transmitter's broadcast range including a receiver for perceiving the first 9-1-1 signal from the transmitter; and
    a predialler, activated by the receiver upon the receiver's perception of the first 9-1-1 signal, the predialler transmitting a second 9-1-1 signal with the precise location data embedded in the second 9-1-1 signal to a 9 1 1 operator upon activation.

12. The system as in claim 11 wherein the receiver and predialler are integrated within a wall jack.

13. The system as in claim 11 wherein the receiver and predialler are integrated within a landline telephone.

14. A system as in claim 11 wherein the landline telephone includes voice-over-IP for transmitting the second 9-1-1 signal.

15. The system of claim 11 where more than one of the landline telephones receives the first 9-1-1 signal, and each landline telephone sends a second 9-1-1 signal, where the second signals are sorted by the 9 1 1 operator.

16. The system of claim 15 where the sorting is done by clustering the included geographic information in each second signal and determining the most likely site of the 9-1-1 event.

17. The system of claim 11 where the sorting is done based upon time of arrival.

18. The system of claim 11 where more than one of the landline telephones receives the first 9-1-1 signal, and each receiving landline telephone polls the other receiving landline telephone with strongest first 9-1-1 signal and earliest first 9-1-1 signal and responds with the second 9-1-1 signal while the others do not respond.

19. A system for providing a 9 1 1 operator with the precise location of a cell phone operator who initiates a 9-1-1 emergency call from a cell phone within the vicinity of any one of a plurality of landline telephones which have been modified to accept a signal from a cell phone and then initiate a second 9-1-1 emergency call, the second 9-1-1 call including Subscriber ID information which provides the 9 1 1 operator with precise location data, the system capable of providing the precise location data without any verbal communication between the cell phone operator and the 9 1 1 operator comprising:
   a cell phone including a first transceiver for transmitting a 9-1-1 signal;
   a landline telephone within the transceiver's broadcast range including a second transceiver for receiving the 9-1-1 signal from the first transceiver and for transmitting a return signal to the first transceiver, the return 9-1-1 signal including precise location data obtained from the landline telephone; and
   the first transceiver for receiving the return 9-1-1 signal and, in response, for transmitting a second 9-1-1 signal with the precise location data embedded in the second 9-1-1 signal.

20. A system for providing a 9 1 1 operator with the precise location of a cell phone operator who initiates a 9-1-1 emergency call from a cell phone within the vicinity of any one of a plurality of landline telephones which have been modified to accept a signal from a cell phone and then initiate a second 9-1-1 emergency call, the second 9-1-1 call including Subscriber ID information which provides the 9 1 1 operator with precise location data, the system capable of providing the precise location data without any verbal communication between the cell phone operator and the 9 1 1 operator comprising:
   a transmitter for transmitting a first signal;
   a cell phone including a transceiver for receiving the first signal and for automatically transmitting a 9-1-1 signal upon reception of the first signal;
   a landline telephone, within the transceiver's broadcast range, including a receiver for receiving the 9-1-1 signal from the cell phone; and
   a predialler, the predialler in communication with and activated upon receiving a signal from the receiver to initiate a 9-1-1 call with precise location data embedded in the 9-1-1 signal to a 9 1 1 operator.

21. A system for providing a 9 1 1 operator with the precise location of a cell phone operator who initiates a 9-1-1 emergency call from a cell phone within the vicinity of any one of a plurality of landline telephones which have been modified to accept a signal from a cell phone and then initiate a second 9-1-1 emergency call, the second 9-1-1 call including Subscriber ID information which provides the 9 1 1 operator with precise location data, the system capable of providing the precise location data without any verbal communication between the cell phone operator and the 9 1 1 operator comprising:
   a transmitter for transmitting a first signal;
   a cell phone including a first transceiver for receiving the 9-1-1 signal and for transmitting a 9-1-1 signal upon reception of the first signal;
   a landline telephone within the first receiver's broadcast range including a second transceiver for receiving the 9-1-1 signal from the first transceiver and for transmitting a return 9-1-1 signal to the first transceiver, the return 9-1-1 signal including precise location data obtained from the landline telephone; and
   the first transceiver for receiving the return 9-1-1 signal and, in response, for transmitting a second 9-1-1 signal with the precise location data embedded in the second 9-1-1 signal.

22. A system for providing a 9 1 1 operator with the location of a cell phone operator, without requiring any verbal communication between the 9 1 1 operator and the cell phone operator, where the location data is subscriber information for a landline telephone the cell phone operator initiating a 9-1-1 call on a cell phone within a facility having a plurality of rooms which share a common facility street address and which facility has a plurality of landline phones comprising:
   the cell phone including a transmitter for transmitting a first 9-1-1 signal;
   a landline telephone within the transmitter's broadcast range, the landline telephone including a transceiver for receiving the first 9-1-1 signal from the cell phone and transmitting a second 9-1-1 signal and a first predialler for transmitting the first 9-1-1 signal to a 9 1 1 operator;
   wherein the first predialler contains the facility's address;
   a wall jack including a receiver for receiving the second 9-1-1 signal from the landline telephone and a second predialler for transmitting the second 9-1-1 signal to a 9 1 1 operator;
   wherein the second predialler contains a room location which is transmitted with the second 9-1-1 signal to provide the 9 1 1 operator with a room number in addition to a facility address.

23. A method for providing a 9 1 1 operator with the location of a cell phone operator, without requiring any verbal communication between the 9 1 1 operator and the cell phone operator, where the location data is subscriber information for a landline telephone, the cell phone operator initiating a 9-1-1 call on a cell phone within a facility having a plurality of rooms which share a common facility street address and which facility has a plurality of landline phones comprising:
   providing a user with a cell phone including a transmitter for transmitting a first 9-1-1 signal;
   enabling a landline telephone within the cell phone's broadcast range including a transceiver for receiving the first 9-1-1 signal from the cell phone and transmitting a second 9-1-1 signal and a first predialler for transmitting the first 9-1-1 signal to a 9 1 1 operator;
   wherein the first predialler containing an address of a building;

enabling an wall jack including a receiver for receiving the second 9-1-1 signal from the landline telephone and a second predialler for transmitting the second 9-1-1 signal to a 9 1 1 operator;

wherein the second predialler containing a room location data from the nearest landline telephone activated by the receiver upon the receiver's receipt of the second 9-1-1 signal to 9 1 1 operator upon activation; and providing the address of the building from the first 9-1-1 signal and the room number of the building from second 9-1-1 signal to the 9 1 1 operator simultaneously.

24. A system for transmitting a signal to a 9 1 1 operator from any one of a plurality of landline telephones in an office building comprising:

a landline telephone including a transmitter for transmitting a triggering signal, the landline telephone encoded with an office number;

an office junction box including a receiver for receiving the triggering signal;

a bypass circuit for bypassing a PBX-type master switching box thereby connecting directly to an office junction box; and a predialler in operative communication with the bypass circuit, the predialler containing precise location activated by the receiver upon the receiver's receipt of the triggering signal, the predialler transmitting a 9-1-1 signal with the office number embedded in the triggering signal to a 9 1 1 operator upon activation.

25. A system as in claim 24 wherein the landline telephone may be connected to the bypass circuit, the landline telephone integrating the receiver and the predialler.

26. A system as in claim 24 wherein each of the plurality of landline telephones is Bluetooth® enabled such that if at least one of the plurality of landline telephones is connected to the bypass circuits, the remaining plurality of landline telephones can chain a signal to each neighbouring landline telephone until the signal reaches at least one of the plurality of landline telephones which is connected directly to the bypass circuit.

27. A system as in claim 24 wherein the bypass circuit contains logic to sort a plurality of incoming 9-1-1 calls to determine the correct call to allow through to the 9 1 1 operator.

28. A system as in claim 27 wherein the bypass circuit sorts the plurality of incoming 9-1-1 calls based on time distance of arrival.

29. A system for providing a 9 1 1 operator with the location of a cell phone operator, without requiring any verbal communication between the 9 1 1 operator and the cell phone operator, where the location data is subscriber information for a landline telephone, the cell phone operator initiating a 9-1-1 call on a cell phone within an office building having a plurality of offices which share a common office building street address and which office building has a plurality of landline phones comprising:

a cell phone including a transmitter for transmitting a 9-1-1 signal;

a landline telephone within the cell phone's broadcast range including a receiver for receiving the 9-1-1 signal from the cell phone;

an office junction box including a receiver for receiving the 9-1-1 signal and a predialler;

a bypass circuit for bypassing a PBX-type master switching box thereby connecting directly to the office junction box; and a predialler in operative communication with the bypass circuit, the predialler containing an office number obtained from the nearest landline telephone and being activated by the receiver upon the receiver's receipt of the 9-1-1 signal, the predialler transmitting the 9-1-1 signal with the office number and address of the office building embedded in the 9-1-1 signal to a 9 1 1 operator upon activation.

30. A system as in claim 29 wherein the landline telephone may be connected to the bypass circuit, the landline telephone integrating the receiver and the predialler.

31. A system for providing a 9 1 1 operator with the location of a cell phone operator, without requiring any verbal communication between the 9 1 1 operator and the cell phone operator, where the location data is subscriber information for a landline telephone, the cell phone operator initiating a 9-1-1 call on a cell phone within an office building having a plurality of offices which share a common office building street address and which office building has a plurality of landline phones comprising:

a cell phone including a first transceiver for transmitting a 9-1-1 signal;

a landline telephone within the cell phone's, broadcast range including a second transceiver for receiving the 9-1-1 signal from the first transceiver and transmitting a return signal to the first transceiver, the return signal including an office number obtained from the nearest landline telephone;

the first transceiver for receiving the return signal and, in response, for transmitting the return signal with the office number and address of the office building embedded in the signal to a 9 1 1 operator upon activation.

32. A system for providing a 9 1 1 operator with the location of a cell phone operator, without requiring any verbal communication between the 9 1 1 operator and the cell phone operator, where the location data is subscriber information for a landline telephone, the cell phone operator initiating a 9-1-1 call on a cell phone within an office building having a plurality of offices which share a common office building street address and which office building has a plurality of landline phones comprising:

a transmitter for transmitting a first 9-1-1 signal;

a cell phone including a transceiver for receiving the first 9-1-1 signal and for transmitting a second 9-1-1 signal upon reception of the first 9-1-1 signal;

a landline telephone within the cell phone's broadcast range including a receiver for receiving the second 9-1-1 signal from the cell phone; and an office junction box including a receiver for receiving the 9-1-1 signal and a predialler;

a bypass circuit for bypassing a PBX-type master switching box thereby connecting directly to the office junction box; and a predialler containing precise location data is obtained from the nearest landline telephone and being activated by the receiver upon the receiver's receipt of the second 9-1-1 signal, the predialler transmitting the 9-1-1 signal with the precise location data embedded in the second 9-1-1 signal to a 9 1 1 operator upon activation.

33. A system as in claim 32 wherein the landline telephone may be connected to the bypass circuit, the landline telephone integrating the receiver and the predialler.

34. A system for providing a 9 1 1 operator with the location of a cell phone operator, without requiring any verbal communication between the 9 1 1 operator and the cell phone operator, where the location data is subscriber information for a landline telephone, the cell phone operator initiating a 9-1-1 call on a cell phone within an office building having a plurality of offices which share a common office building street address and which office building has a plurality of landline phones comprising:
   a transmitter for transmitting a first 9-1-1 signal;
   a cell phone including a first transceiver for receiving the first 9-1-1 signal and for transmitting a second 9-1-1 signal upon reception of the first 9-1-1 signal;
   a landline telephone within the cell phone's broadcast range including a second transceiver for receiving the second 9-1-1 signal from the first transceiver and transmitting a return 9-1-1 signal to the first transceiver, the return 9-1-1 signal including an office number-obtained from the nearest landline telephone; and
   the first transceiver for receiving the return 9-1-1 signal and, in response, for transmitting the 9-1-1 signal with the office number and address of the office building embedded in the return 9-1-1 signal to a 9 1 1 operator upon.

35. A system for providing a 9 1 1 operator with the location of a cell phone operator, without requiring any verbal communication between the 9 1 1 operator and the cell phone operator, where the location data is subscriber information for a landline telephone, the cell phone operator initiating a 9-1-1 call on a cell phone within an office building having a plurality of offices which share a common office building street address and which office building has a plurality of landline phones wherein the landline telephones are all connected to a PBX-type master switching box in a building comprising:
   a cell phone including a transmitter for transmitting a first 9-1-1 signal;
   a landline telephone within the cell phone's broadcast range including a transceiver for receiving the first 9-1-1 signal from the cell phone and transmitting a second 9-1-1 signal and a first predialler for transmitting the first 9-1-1 signal to a 9 1 1 operator;
   wherein the first predialler contains an address of an office building;
   an office junction box including a receiver for receiving the second 9-1-1 signal from the landline telephone and a second predialler for transmitting the second 9-1-1 signal to a 9 1 1 operator;
   a bypass circuit for bypassing the PBX-type master switching box thereby connecting directly to the office junction box; and
   wherein the second predialler containing a office number from the nearest landline telephone activated by the receiver upon the receiver's receipt of the second 9-1-1 signal to a 9 1 1 operator upon activation.

36. A method for providing a 9 1 1 operator with the location of a cell phone operator, without requiring any verbal communication between the 9 1 1 operator and the cell phone operator, where the location data is precise enough to satisfy the FCC's e911 mandate, the cell phone operator initiating a 9-1-1 call on a cell phone within an office building having a plurality of offices which share a common office building street address and which office building has a plurality of landline phones wherein the landline telephones are all connected to a PBX-type master switching box in a building comprising:
   providing a user with a cell phone including a transmitter for transmitting a first 9-1-1 signal;
   enabling a landline telephone within the cell phone's broadcast range including a transceiver for receiving the first 9-1-1 signal from the cell phone and transmitting a second 9-1-1 signal and a first predialler for transmitting the first 9-1-1 signal to a 9 1 1 operator;
   wherein the first predialler contains an address of an office building;
   enabling an office junction box including a receiver for receiving the second 9-1-1 signal from the landline telephone and a second predialler for transmitting the second 9-1-1 signal to a 9 1 1 operator;
   providing a bypass circuit for bypassing the PBX-type master switching box thereby connecting directly to the office junction box;
   wherein the second predialler containing a office number from the nearest landline telephone activated by the receiver upon the receiver's receipt of the second 9-1-1 signal to 9 1 1 operator upon activation; and
   providing the address of the building from the first 9-1-1 signal and the office number of the office building from the second 9-1-1 signal to the 9 1 1 operator simultaneously.

37. A system for determining the precise location of a lost child comprising:
   a transceiver hidden on the child, the transceiver storing a unique identifier;
   a transmitter for sending a signal to the transceiver upon which the transceiver will transmit a signal coded with the unique identifier,
   a landline phone within the transmitting range of the transceiver, the landline phone enabled with a receiver and a predialler, the receiver for receiving the signal from the transceiver and the predialler for initiating a 9-1-1 call on the landline phone, completing a 9-1-1 call and passing along the unique identifier and the landline phone's subscriber identification.

38. A system for conveying location information of a cell phone operator to a 9 1 1 operator where the location data is subscriber information and which requires no verbal communication between the cell phone operator and the 9 1 1 operator, the system comprising:
   a cell phone having cellular communication means and a first short-range transceiver;
   the cell phone sending a signal through the transmitter when the cell phone operator sends a 9-1-1 code a second transceiver for receiving the first signal;
   a predialer in communication with the second transceiver;
   the predialer activated upon the second transceiver receiving the first signal and transmitting a 9-1-1 call upon activation, the 9-1-1 call providing a 9 1 1 operator with the predialer's subscriber information;
   the second transceiver sending a second signal to the first transceiver for communicating that the 9-1-1 call was made;
   the first transceiver determining whether the second signal was received and initiating a 9-1-1 call through the cell phone's cellular communication means only if the second signal was not received.

39. A system for use in at least one of a plurality of facilities, the at least one facility having a plurality of discrete rooms some of which are distal to each other, the number of rooms being large enough that an emergency identified at the facility would not provide enough location data for an emergency response team to pinpoint the location of the emergency in a timely manner, comprising:
   at least two of the plurality of rooms having devices, the devices capable of sending an emergency signal to a 9 1 1 operator, the at least two devices sharing a common junction box, the at least two devices capable of initiating a 9-1-1 call upon receiving a 9-1-1 signal transmitted from a proximate cell phone; at least one of a plurality of cell phones capable of transmitting a 9-1-1 call to a 9 1 1 operator, the devices programmable with the location of the room in which the device is situate; a bypass circuit for bypassing the common junction box in operative communication with each of the at least two devices for allowing 9-1-1 calls initiated from the at least two devices to provide information directly to a 9 1 1 operator including the room identification to pinpoint the location of the cell phone operator.

* * * * *